United States Patent [19]

Langecker

[11] 4,120,635

[45] Oct. 17, 1978

[54] BLOW MOLD FOR THE PRODUCTION OF BELLOWS MADE OF A HIGHLY ELASTIC PLASTIC

[76] Inventor: Erhard Langecker, Hohbuschener Weg 5, Meinerzhagen, Fed. Rep. of Germany

[21] Appl. No.: 765,984

[22] Filed: Feb. 7, 1977

[30] Foreign Application Priority Data

Feb. 10, 1976 [DE] Fed. Rep. of Germany ....... 2605546

[51] Int. Cl.² .............................................. B29D 23/03
[52] U.S. Cl. .................................... 425/535; 425/522; 425/537; 425/451.9
[58] Field of Search ............... 425/812, 388, 537, 522, 425/535, 451.9

[56] References Cited

U.S. PATENT DOCUMENTS

| | | | |
|---|---|---|---|
| 2,790,994 | 5/1957 | Cardot et al. | 425/388 X |
| 3,151,360 | 10/1964 | Jurgeleit | 425/812 X |
| 3,704,081 | 11/1972 | Immel | 425/812 X |
| 3,924,992 | 12/1975 | Hegler | 425/539 X |
| 3,953,273 | 4/1976 | Faller | 425/388 X |
| 3,982,877 | 9/1976 | Wyeth et al. | 425/388 X |

*Primary Examiner*—Richard B. Lazarus
*Attorney, Agent, or Firm*—Basile and Weintraub

[57] ABSTRACT

A blow mold for the production of bellows of the type made of a highly elastic plastic. The blow mold is constructed from individual level-parallel disks which form the level of the outer apexes of two adjacent folds and by forming a slot from each pair of adjacent disks which ends at the outer apex and wherein the slot serves to vent air.

5 Claims, 6 Drawing Figures

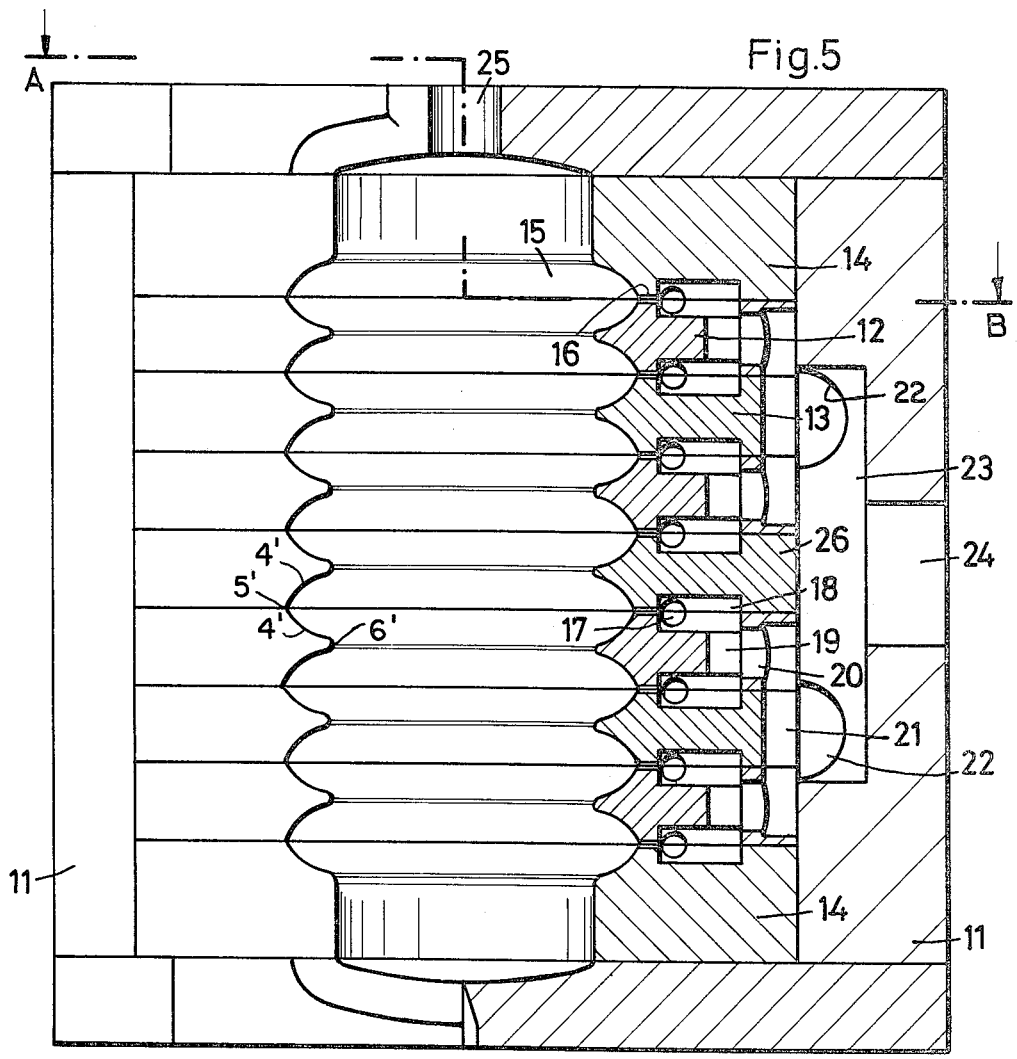
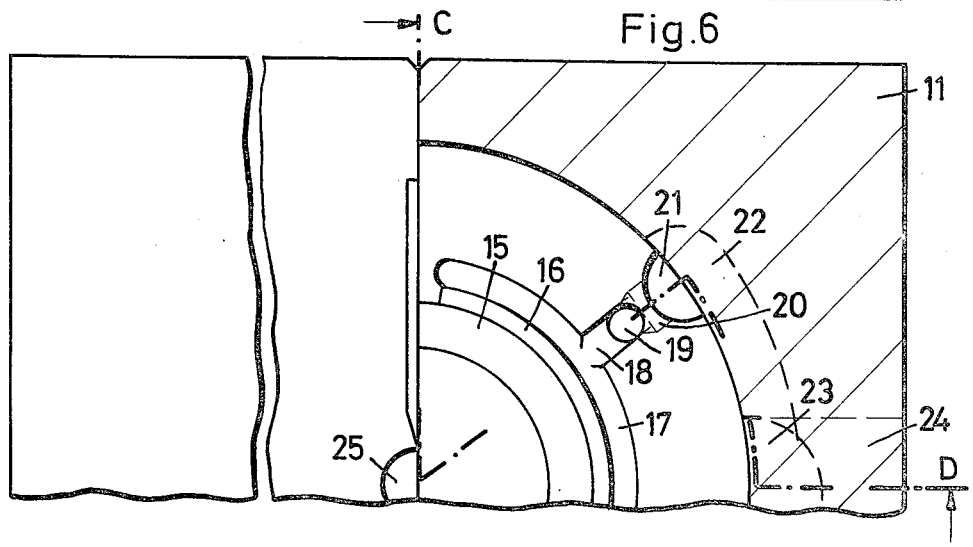

BLOW MOLD FOR THE PRODUCTION OF BELLOWS MADE OF A HIGHLY ELASTIC PLASTIC

BACKGROUND OF THE INVENTION

I. Field of the Invention

The invention concerns a blow mold for the production of bellows made of highly elastic plastic.

II. Description of the Prior Art

For bellows, especially those used for the construction of automobiles where, for instance, at the steering mechanism the bellows come in contact with oil, the demand exists for bellows made of a material, which is substantially resistant with regard to chemicals and also mechanical stress and strain, and which can be subjected to the constant stress and strain during use without danger of a premature destruction. Since rubber, which was used up to now, does not possess the necessary resistance, bellows have been used consisting of a plastic which possesses sufficient resistance and, in addition, is highly elastic. Such a plastic is, for instance, the so-called polyurethane. These bellows, which consist of plastic, are manufactured by means of blow molding employing customary methods, where the raw material represents a foil for bellows which are constructed in one level and where the raw material represents a tube for bellows which are constructed in the form of a hollow structure. The foil or the tube, respectively, is brought into contact with a mold by means of blow pressure. The forming surface of the mold corresponds to the surface of the bellows. The individual folds, which are connected to each other, for the known bellows have a triangular cross-section and linear side flanks. It is known that the blowing of the bellows results in a reduction of the wall thickness of the folds between the inner apex and the outer apex of each fold, because the foil or the tube respectively comes in contact with the linear side flanks of the fold as a result of the applied pressure. This results in a cooling of the freshly made bellows at the area of contact with the side flanks, and in this way a further stretching of the freshly made bellows is prevented. Therefore, the wall thickness at the upper apex of the fold is substantially smaller as compared to the wall thickness at the inner apex. Since the point of smallest wall thickness is the deciding factor for the durability and the resistance to stress and strain, a foil or a tube must be employed for blow molding with such an original wall thickness that the outer apex of each fold exhibits the desired wall thickness, despite the reduction of the wall thickness which occurs in the folds. This necessarily results in a relatively high consumption of raw material, which is actually unnecessary and which represents an economic disadvantage, as well as resulting in a prolonged production time. In addition, the removal of the blow-molded bellows from the mold is difficult because of its shape, and usually the bellows have to be removed manually from the mold, after the two half-molds have been opened. This leads to a further prolongation of the production time.

There exists a need to keep the raw material consumption for the production of such plastic bellows by means of blow molding as low as possible, without reducing the wall thickness of the outer apex of the fold to a thickness below the desired minimum thickness, and at the same time to make it possible to eject the bellows from the mold in order to automatize the production.

SUMMARY OF THE INVENTION

The invention solves this problem by constructing the mold from individual, level-parallel disks, which form the level of the outer apexes of two adjacent folds, and by forming a slit from each pair of adjacent disks, which ends at the outer apex and which slit serves as a vent for air.

It was recognized by the applicant, that the reduction of the wall thickness of the bellows at the outer apex of the fold is mainly the result of the fact that the venting of the air from the mold through the dividing plane which exists between both of the mold-halves does not occur with the necessary speed. In this way the disadvantage described above is encumbered, namely that the freshly made bellows contacts the side walls of the mold before it is completely blown, which situation will result in a weakening of the wall thickness at the outer apex. By means of the construction of the form according to the present invention in the shape of individual, level-parallel disks and due to the slit, which ends at each outer apex of the mold, a reliable, fast, and uniform air venting of all the spaces, which are located between the inner apexes, is guaranteed. As a result, the freshly made bellows contacts all of the side flanks at the same time, guaranteeing sufficient stretching of the freshly made bellows and an optimum wall thickness at the outer apex of the bellows.

Another characteristic feature is the fact that the slit is closed on both sides in the vicinity of the edge of the mold and is connected with a groove, which runs along its entire length, and which groove can be connected either with compressed air or with air of a pressure lower than atmospheric pressure. In this way an optimum of uniformity with regard to the air venting along the entire length of the outer apex line is guaranteed.

For the production of bellows, which are located in one level, such as they are used for the covering of machines, one starts with a foil, as mentioned previously. The foil is brought into contact with an appropriate mold by means of application of compressed air.

However, by far the largest need exists in the area of the cylindrical type of bellows, as they often are used for steering mechanisms and also for the construction of automobiles. The blow mold which is used for the production of such cylindrical bellows is characterized by the fact that the disks of each half of the mold are equipped with s slot, which corresponds to half of the size of the slit, which slot is located on the frontal plane, which frontal plane contacts an adjacent disk, and which slot starts at the inner wall of the mold, and which slot transforms into a groove having the shape of a half-circle and extending along its length. The groove is connected with at least one radial slot, and every other disk is equipped with a drilled hole, which connects both radial slots, and which drilled hole is connected with a radial central drilled hole, which in turn is connected with a source of compressed air or air at a pressure lower than atmospheric pressure. It is essential that the sum of the cross-sections of all the grooves corresponds approximately with the cross-section of the main line, which is connected to the source of compressed air or air at a pressure lower than atmospheric pressure. The addition of compressed air or air at a pressure lower than atmospheric pressure from the main line to the grooves ensues via channel connections, where each channel ends at two channels of opposite directions, which latter channels show approximately each half of the cross-section of the former channel. Due to the fact that each half-mold is put together from a plurality of disks, the frontal planes on both sides of the disks are located in the planes of the apexes of the folds, which apexes are adjacent to each other, and by means of the slots and channels, which serve for the transfer of air of a pressure lower than atmospheric pressure, it is achieved that an absolutely uniform suction effect, which serves for air venting, is guaranteed at each outer apex of the bellows in such a way that the wall thickness is also the same at each outer apex. In addition, the location of the channels also serves for the uniform transfer of air of a pressure lower than atmospheric pressure in such a way that each channel is connected with two channels leading to opposite directions, the total cross-section of which latter channels is equal to the cross-section of the former channel.

Furthermore, it is of substantial importance with regard to the invention that the areas of the mold which form the side flanks of the folds of the bellows are curved towards the outside. Due to the outwardly curved side areas of the mold, the possibility of a premature and disadvantageous contact of the freshly made bellows with the side flanks of the folds is further reduced; thus, this contributes to the solving of the problem, on which this invention is based, in an advantageous manner. As a result of the side areas of the mold which are curved towards the outside and, thus, as a result of the side areas of the bellows, which are also curved towards the outside, a contact of the freshly made bellows with the curved areas of the mold is substantially reduced, when the freshly made bellows enters into the space between the inner apexes of the mold. In this way, the material which is located between the inner apexes of the mold can stretch to a higher degree than this would be the case for actually known linear side areas. The part of the freshly made bellows, which is located between the inner apexes of the mold, enters into the mold and between these apexes approximately in the shape of a half-circle, in such a way that a contact of the freshly made bellows with the side areas occurs only at a substantially lesser degree than that for straight side areas. In this way the wall thickness for the outer apex is optimized.

Therefore, due to the construction of the mold with its slits, which end at the outer apex, and due to the curved shape of the side flanks, the invention results in a significant technical progress, which in one way is based on the larger wall thickness at the outer apex and in another way is based on the fact that a faster manufacturing cycle results because of the lower material consumption, which will result in an increased output.

The process for the production of a bellows with the use of the mold of this invention is characterized by the fact that during the removal of the bellows from the mold, the slits, which serve for air venting, are connected with the compressed air; and at the same time a preferably controllable remaining blow pressure is maintained. The applicant has recognized that the location of the slits, which serve for the venting of air, and their corresponding channels can advantageously be used for the purpose of ejecting the completely blown bellows from the mold. In this way the removal by hand, which to date was usually necessary, will not be necessary. For this purpose, the compressed air is connected to each individual slit via the channels shortly before the two mold halves are opened. In this way the bellows is uniformly separated from the mold at each outer apex; and, thus, an unobjectionable automatic separation of the bellows from the mold is guaranteed. The remaining blow pressure, which is maintained in the bellows during this period of time, prevents a distortion of the bellows towards the inside at the outer apex lines on account of the compressed air, which serves for the separation from the mold. The amount of the remaining blow pressure is variable in order that an equilibrium can be established with the air pressure, which serves to separate the bellows from the mold. In this way it is possible to eject the bellows from the mold in an unobjectionable condition within the framework of an automatic production.

BRIEF DESCRIPTION OF THE DRAWINGS

The attached drawings show an example of one form of the invention wherein like components are designated by the same numeral, and wherein:

FIG. 5 is a cross-sectional view of a mold taken along Line C-D of FIG. 6; and

FIG. 6 is a cross-sectional view of a mold taken along Line A-B of FIG. 5.

DESCRIPTION OF THE PREFERRED EMBODIMENT

Figure 1:
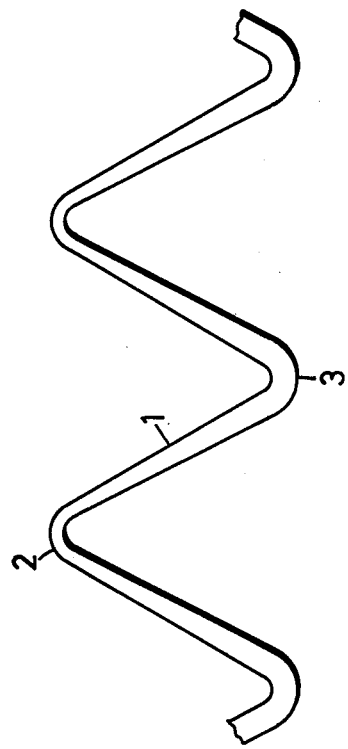
FIG. 1 is a schematic view of the profile of a known bellows in stretched position.
Figure 3:
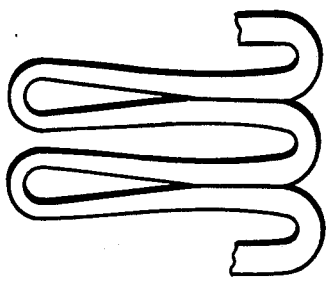
FIG. 3 is a view like FIG. 1 in compressed position.

FIGS. 1 and 3, respectively, show the profile of an actually known bellows in a stretched position and in a compressed position. The bellows is equipped with straight side flanks 1, which connect inner apexes 3 and outer or upper apexes 2 in a zig-zag shape. If such a bellows is blown from a tube, the profile which is shown in FIGS. 1 and 3 attains the depicted uneven wall thickness, which is at a maximum at the lower apex 3 and decreases gradually along the side flanks 1 until it reaches its smallest size at the upper apex 2. This smallest wall thickness at the upper apex 2 must comply with the desired wall thickness for the use of the bellows in such a way that an actually unnecessary expenditure of material results with regard to the production of such a bellows, on account of the wall thickness, which increases from the outer apex 2 towards the inner apex 3. Since the wall thickness is the greatest at the inner apexes 3, the inner apexes 3 are stiffer than the outer apexes 2 in case of an axial distortion. This will result in a higher degree of stress and strain for the apexes 2 in comparison to the apexes 3, especially in case of permanent use.

Figure 2:
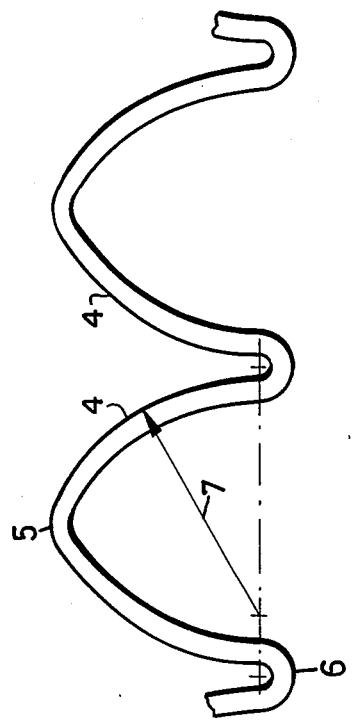
FIG. 2 is a view of a profile in accordance with the invention and, like FIG. 1, in stretched position.
Figure 4:
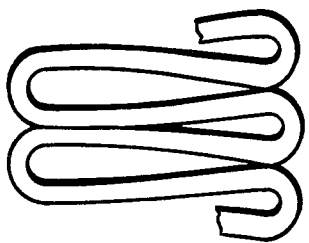
FIG. 4 is a view like FIG. 2 in compressed form.

As shown in the profile in FIGS. 2 and 4, the side flanks 4 are curved towards the outside. This results in a wall thickness which decreases from the inner apex 6 towards the outer apex 5 during the blowing of the bellows. This reduction of the wall thickness is substantially smaller as compared to the form according to FIG. 1, since due to the curvature of the side flanks 4 of the fold, the part of the freshly made bellows which enters the space between the inner apexes 6' contacts the side areas 4' of the mold to a much lesser extent. Thus, with a profile shaped in accordance with FIG. 2, the same stability and durability of the bellows can be attained as for a form according to FIG. 1, but with a lesser expenditure of material. In addition, it has to be considered that due to their lesser wall thickness, the inner apexes 6 do not exhibit the same stiffness as in the form according to FIG. 1, resulting in a practically uniform distortion of the outer apexes 5 and the inner apexes 6 in case of axial distortion and, in turn, resulting in a longer life of the bellows.

As shown in FIG. 5, each of the two mold-halves consists of disk-like elements 12 and 13. The parallel frontal planes of these elements 12 and 13 are located in the planes 5; of two adjacent outer disks. Above and below the disks 12 and 13, which are stacked to form a column, foot pieces 14 are located, which form the attachment ends of the bellows. In each plane of an outer apex 5' a slit 16 is located between the adjacent disks 12 and 13 or 12 and 14, respectively, which slit ends at the outer apex 5', which apex 5' is formed by the side areas 15, which is of such size that air venting is guaranteed and material cannot be pressed into it.

As shown in FIG. 6, the slit 16 extends in the form of a part of a circle towards the vicinity of the edges of the mold-half, which form the parting plane, in this way closing it on both sides. The back side of slit 16 is transformed into a half-circle-shaped groove 17 at each surface of the disks 12 and 13 and at the foot pieces 14, which is connected to at least one radial space 18. For every other part 12 the spaces 18, which are located in both the frontal planes, are connected by an axially drilled hole 19, which, in turn, is connected with another radially drilled hole 20. Two parts 12, which enclose a disk 13 between each other, are equipped with an axial groove 21, which connects the drilled holes 20 of parts 12 by means of part 13. As shown in FIG. 5, two of these stacks of disks, which consist of one part 13 and two parts 12, are arranged, which stacks are separated from each other by means of a middle disk 26. Two circle-shaped grooves 22 are located at an axial distance from each other and at the axial wall of the element 11. Every other groove 22 is connected with one of the axial grooves 21. Both of the circle-shaped grooves 22, in turn, are connected with each other by means of a vertical channel 23. The main air line 24, which is connected with the source of compressed air or air of a pressure lower than atmospheric pressure, is connected with and ends at the middle of the vertical channel 23. The cross-section of the main air line 24 is twice the size of the cross-section of channel 23. The cross-section of channel 23 is twice the size of the cross-section of grooves 22. The cross-section of grooves 22, in turn, is twice the size of the cross-section of grooves 21. The cross-section of grooves 21 is equal in size to the cross-section of channel 20. The cross-section of channel 20, in turn, is twice the size of the cross-section of channel 19 or channel 18, respectively. Finally, the cross-section of channel 18 is twice the size of the cross-section of channel 17.

For the production of a cylinder-shaped bellows employing a mold as it is depicted in FIGS. 5 and 6, a tube is placed as usual between both of the mold-halves. Then the mold-halves are closed and the tube-to-be-blown, which is not shown, is blown up by means of a blow nozzle, which is not shown. At the same time the main line 24 is connected with air of a pressure lower than atmospheric pressure, such that the air is vented from each outer apex 5' by means of the slits 16. When the bellows is blown up and cooled down, it is vented by means of the opening 25. At the same time a source of compressed air is connected to the main line 24, which will result in a lifting of the bellows from the mold at each individual outer apex 5 by means of the slits 16 after the mold has been opened. Then the bellows is taken off the blow nozzle.

It can thus be seen that the present invention has provided a new and improved blow mold, and it should be understood by those skilled in the art of such blow molds that other forms can be had, all coming within the spirit of the invention and the scope of the appended claims.

What is claimed is as follows:

1. A blow mold for the production of bellows made from a highly elastic material, said blow mold comprising:
   a pair of separable mold halves, each mold half having a plurality of adjacent semi-circular shaped disk elements having abutting facing areas defining facing planes and are positioned parallel with reference to each other, said disk elements of each mold half being stacked to form a column, said column defining a bellows-shaped mold cavity, the cavity having outer apexes and inner apexes, the outer apexes of the mold cavity being located at the facing planes of adjacent disk elements, the inner apexes being defined by the innermost extension of each disk element, the areas of the cavity between said inner and outer apexes defining the side flanks of the bellows-shaped mold cavity, said side flanks being curved from the inner to the outer apexes, said facing planes of said adjacent disk elements each defining at each of said outer apexes an arcuate slit which extends substantially the full arcuate length of the adjacent disk elements, said slits communicating with said mold cavity at said outer apexes; and
   passage means in said mold for selectively communicating compressed air to said cavity or a vacuum to said slits for respectively communicating compressed air to said cavity and venting air from said cavity.

2. The blow mold defined in claim 1 characterized by the fact that each of said slits has an arcuate length less than 180°, said passage means having a groove which extends along the length of the slit, said groove connected with compressed air or with air of a pressure lower than atmospheric pressure.

3. The blow mold defined in claim 1 wherein the disks of each half-mold at each facing plane contact an adjacent disk to define said passage means, said passage means having a space which corresponds to one half of the size of the slit, and which space originates at the inner wall of the mold, and which space is transformed into a half-circle-shaped groove, said groove extending along the length of the space, the groove being connected to at least one radially directed space and that every other disk is equipped with a drilled hole, which connects both the radial spaces, said drilled hole being connected with a radial central drilled hole, which, in turn, is connectable with a source of compressed air or air of a pressure lower than atmospheric pressure.

4. The blow mold defined in claim 3 further comprising a main line, the sum of the cross-sections of all grooves corresponding approximately with the cross-section of the main line and with the cross-section of the source of the compressed air or the air of a pressure lower than atmospheric pressure, and that the addition of compressed air or air of a pressure lower than atmospheric pressure from the main line to the grooves occurs via channels, where each channel runs into two channels which point to opposite directions, which two channels exhibit each approximately only half of the cross-section of the former channel.

5. The blow mold defined in claim 1 characterized by the fact that the curvature of the areas of the mold corresponds to a part of a circle, the center of which circle is located on the connecting plane of the centers of the inner apexes of the bellows.

* * * * *